(12) United States Patent
Lemberg et al.

(10) Patent No.: US 12,149,402 B2
(45) Date of Patent: *Nov. 19, 2024

(54) METHOD AND SYSTEM FOR EVALUATING PEER GROUPS FOR COMPARATIVE ANOMALY

(71) Applicant: Microsoft Technology Licensing, LLC, Redmond, WA (US)

(72) Inventors: Rachel Lemberg, Herzliya (IL); Yaniv Lavi, Herzliya (IL); Dor Bank, Herzliya (IL); Raphael Fettaya, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,941

(22) Filed: Mar. 3, 2023

(65) Prior Publication Data

US 2023/0216728 A1 Jul. 6, 2023

Related U.S. Application Data

(63) Continuation of application No. 17/390,411, filed on Jul. 30, 2021, now Pat. No. 11,601,325.

(51) Int. Cl.
*H04L 41/0631* (2022.01)
*H04L 67/75* (2022.01)

(52) U.S. Cl.
CPC ............ *H04L 41/065* (2013.01); *H04L 67/75* (2022.05)

(58) Field of Classification Search
None
See application file for complete search history.

(56) References Cited

U.S. PATENT DOCUMENTS

| | | | |
|---|---|---|---|
| 6,748,555 B1* | 6/2004 | Teegan | G06F 11/3409 714/E11.2 |
| 9,419,917 B2* | 8/2016 | Eaton | H04L 47/785 |
| 9,514,387 B2* | 12/2016 | Eaton | H04L 43/06 |
| 9,632,858 B2* | 4/2017 | Sasturkar | H04L 41/065 |
| 2015/0081881 A1* | 3/2015 | Eaton | H04L 43/04 709/224 |
| 2015/0081882 A1* | 3/2015 | Bartucca | G06F 9/5027 709/224 |
| 2015/0081883 A1* | 3/2015 | Katz | G06F 9/5027 709/224 |
| 2015/0082432 A1* | 3/2015 | Eaton | H04L 43/16 726/23 |
| 2018/0367551 A1* | 12/2018 | Muddu | G06F 3/04847 |

* cited by examiner

*Primary Examiner* — Ranodhi Serrao

(57) ABSTRACT

Example aspects include techniques for implementing peer group evaluation for comparative anomaly. These techniques may include determining a candidate group including a plurality of component metrics, and determining that the plurality of component metrics are a peer group based at least in part on a cluster profile of the candidate group and the candidate group exhibiting peer-like behavior of a period of time. In addition, the techniques may include detecting anomalous activity based at least in part on first performance information of a component metric deviating from second performance information for the peer group, and providing a notification of the anomalous activity.

20 Claims, 4 Drawing Sheets

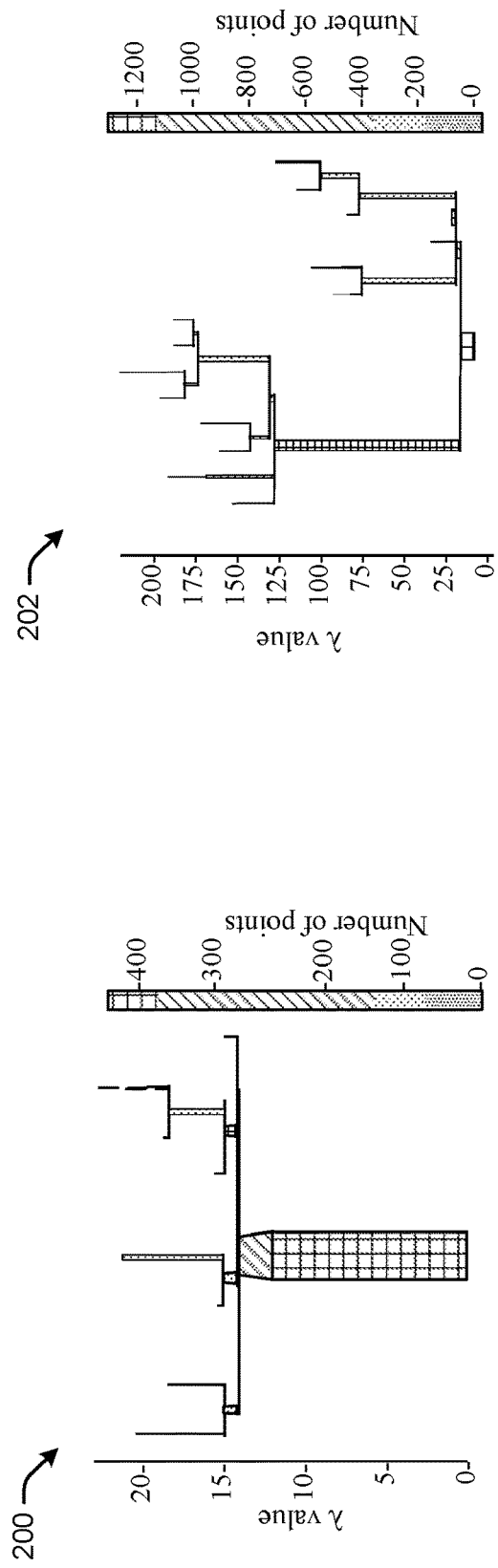
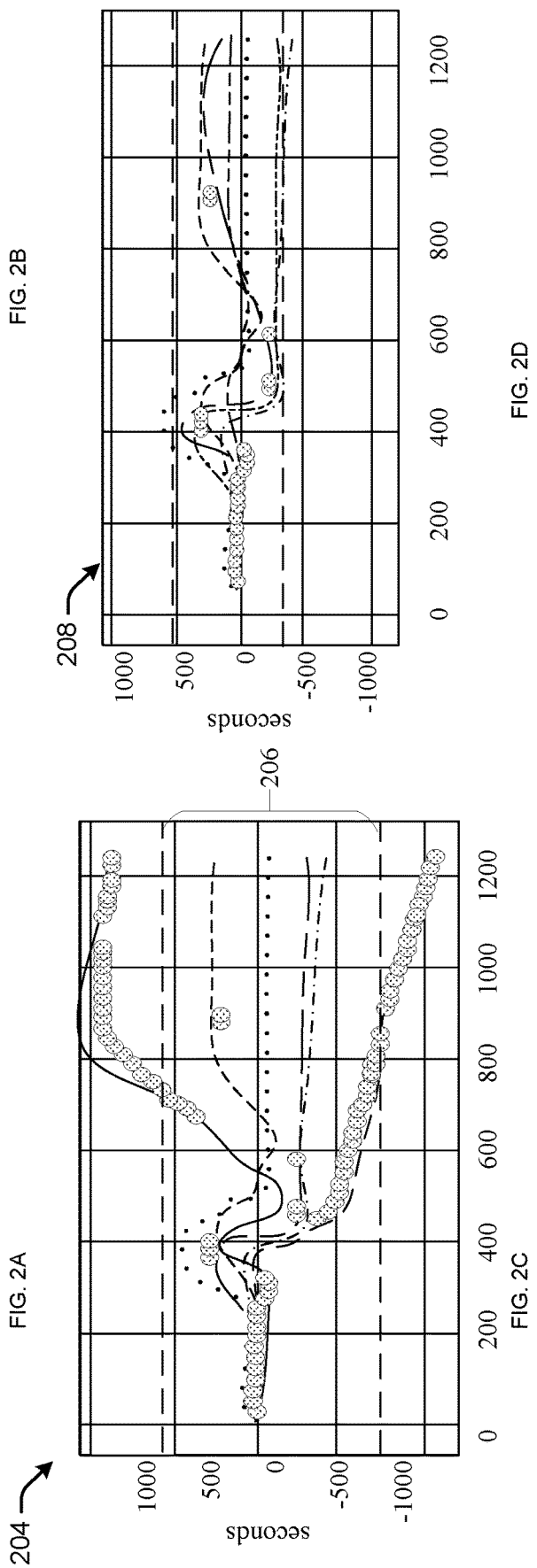
FIG. 2A  FIG. 2B  FIG. 2C  FIG. 2D

METHOD AND SYSTEM FOR EVALUATING PEER GROUPS FOR COMPARATIVE ANOMALY

CROSS-REFERENCE TO RELATED TO APPLICATIONS

This application is a continuation of U.S. patent application Ser. No. 17/390,411 filed on Jul. 30, 2021, entitled "Method and System for Evaluating Peer Groups for Comparative Anomaly," which is incorporated herein by reference in its entirety.

BACKGROUND

A cloud computing environment may provide one or more services to customers over a network. Further, the cloud computing environment may employ a monitoring service for detecting issues arising within the one or more services. Anomaly detection may be used to determine when patterns in data do not match an expected pattern. For example, a monitoring service may perform anomaly detection over cloud computing performance data associated with the one or more services to detect a service issue. However, in many instances, monitoring a single service may not be useful as the monitoring service may not have accurately determined criteria defining abnormal activity by the single service. Further, monitoring a group of services to identify abnormal activity by one of the services with respect to the group may be ineffective when one or more services do not belong in the group as the monitoring service may noisily generate inaccurate incident reporting and/or fail to identify anomalous behavior.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include determining a candidate group including a plurality of component metrics, each component metric corresponding to an associated cloud component and expected to have measurements within a range associated with the candidate group, and determining that the plurality of component metrics are a peer group based at least in part on a cluster profile of the candidate group and the candidate group exhibiting peer-like behavior over a period of time. The method may further include collecting first performance information for a component metric of the plurality of component metrics, detecting anomalous activity based at least in part on the first performance information deviating from second performance information for the peer group, and providing a notification of the anomalous activity.

In another aspect, a device may include a memory storing instructions, and at least one processor coupled to the memory and to execute the instructions to: determine a candidate group including a plurality of component metrics, each component metric corresponding to an associated cloud component and expected to have measurements within a range associated with the candidate group, determine that the plurality of component metrics are a peer group based at least in part on a cluster profile of the candidate group and the candidate group exhibiting peer-like behavior over a period of time, collect first performance information for a component metric of the plurality of component metrics, detect anomalous activity based at least in part on the first performance information deviating from second performance information for the peer group, and provide a notification of the anomalous activity.

In another aspect, an example computer-readable medium storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 2A illustrates an example graphical representation of a candidate group having a cluster eligible cluster profile, in accordance with some aspects of the present disclosure.

FIG. 2B illustrates an example graphical representation of a candidate group having a cluster ineligible cluster profile, in accordance with some aspects of the present disclosure.

FIG. 2C illustrates an example graphical representation of a candidate group exhibiting peer-like behavior over a period of time, in accordance with some aspects of the present disclosure.

FIG. 2D illustrates an example graphical representation of a candidate group failing to exhibit peer-like behavior over a period of time, in accordance with some aspects of the present disclosure.

DETAILED DESCRIPTION

Figure 1:
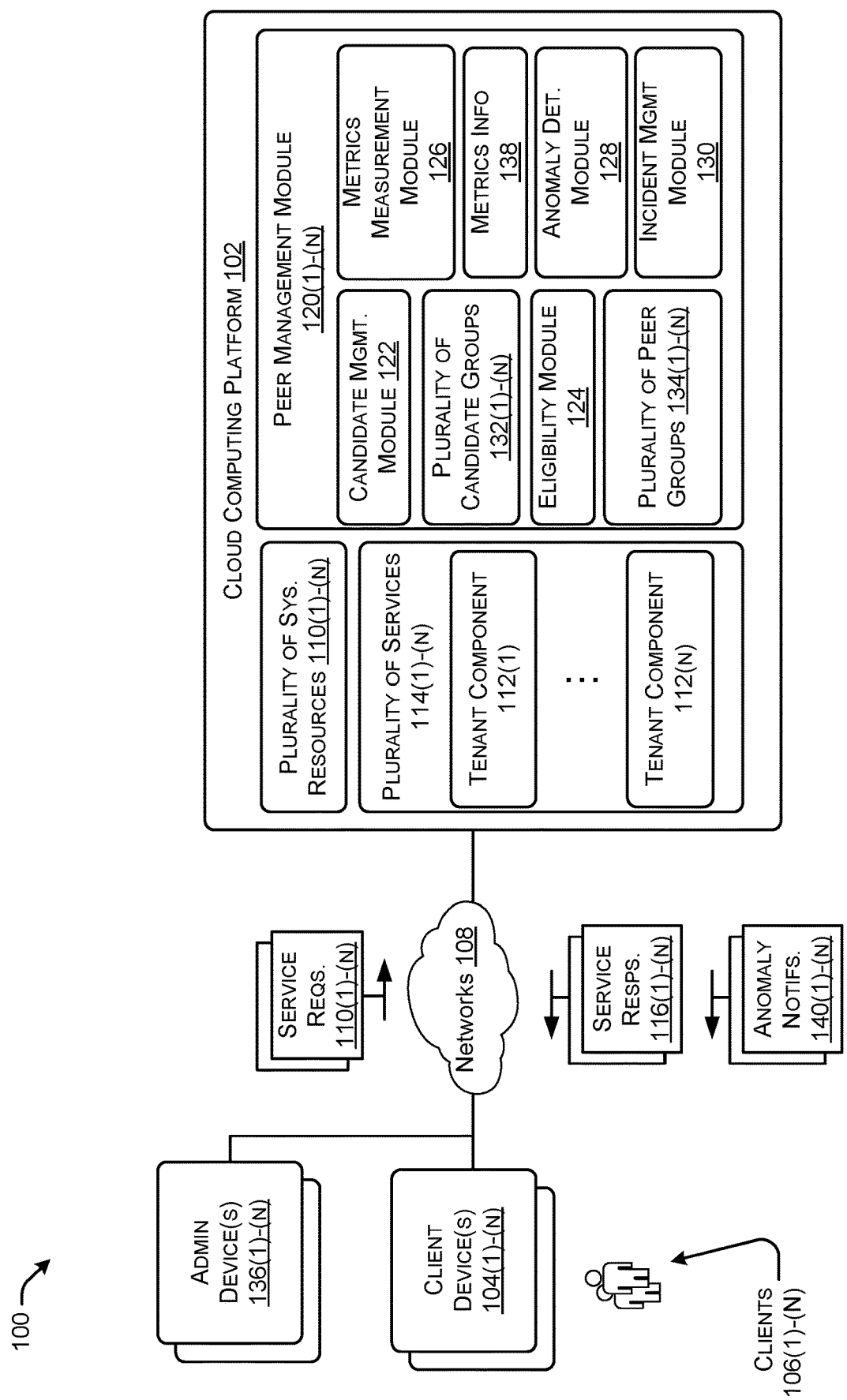
FIG. 1 is a diagram showing an example of a cloud computing system, in accordance with some aspects of the present disclosure

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for evaluating peer groups for comparative anomaly. In particular, aspects of the present disclosure provide a peer management module configured to accurately identify peer groups of cloud component metrics, and utilize the peer groups to detect anomalous behavior within a cloud computing environment. As used herein, in some aspects, a peer of a cloud component metric may refer to another cloud component metric expected to display similar behavior over a period of time due a common or related attribute, function, and/or use. As used herein, in some aspects, a cloud component metric may refer to one or more measurements associated with activity of a component of the cloud computing environment. Accordingly, for example, a cloud computing environment may employ the peer management module to provide accurate incident reporting via peer based anomaly detection, which may be used to improve system performance and/or reduce time to mitigate of service incidents.

In accordance with some aspects of the present disclosure, a peer management module is configured to accurately detect anomalous behavior based on deviations in peer activity in near-real time. For example, the peer management module may be configured to organize cloud components into peer groups based on a pointwise technique and a non-pointwise technique. In some aspects, a "pointwise" technique may refer to analyzing measurements of one or more time series within individual time periods of capture. In some aspects, a "non-pointwise" technique may refer to analyzing measurements of one or more time series without relation to their time period of capture. In particular, the peer management module may confirm that a candidate group of cloud component metrics does not include one or more outliers in a pointwise technique and/or multiple distinct groups of cloud component metrics in a non-pointwise technique before establishing the candidate group as a peer group. By confirming that the cloud component metrics form a peer group, the peer management module avoids implementing an ineffective monitoring process that will surface unhelpful anomaly notifications based on false assumptions of a peer relationship between cloud component metrics. Further, the peer management module may be configured to employ the pointwise technique to perform real-time identification of incidents within a cloud computing environment based on the peer groups, thereby providing accurate incident reporting based on comparative anomaly.

Illustrative Environment

FIG. 1 is a diagram showing an example of a cloud computing system 100, in accordance with some aspects of the present disclosure.

As illustrated in FIG. 1, the cloud computing system 100 may include a cloud computing platform 102, and a plurality of client devices 104(1)-(n) associated with a plurality of clients 106(1)-(n). The cloud computing platform 102 may be a multi-tenant environment that provides the client devices 104(1)-(n) with access to applications, services, files, and/or data via one or more network(s) 108. In particular, the cloud computing platform 102 may implement a multi-tenant architecture wherein system resources 110(1)-(n) of the cloud computing platform 102 are shared among the tenants but individual data associated with each tenant is logically separated. As described herein, the tenants may be customers of the cloud computing platform 102. Further, the tenants may have relationships with the plurality of clients 106(1)-(n), and provide one or more tenant components 112(1)-(n) to the plurality of client devices 104(1)-(N) via the cloud computing platform 102.

As an example, the tenant component 112(1) may be a website, and the client device 104(1) may be a visitor to the website. Further, the tenant associated with the tenant component 112(1) may employ the cloud computing platform 102 to provide features of the website (i.e., tenant component 112(1)) to the client device 104(1). For instance, the tenant component 112(1) may configure the cloud computing platform 102 to transmit the content of the website to the client device 104(1) via the network 108. As another example, the tenant component 112(2) may be a database instance and the client device 104(1) may include a tenant application that utilizes the database instance via the network 108.

The network(s) 108 may comprise any one or combination of multiple different types of networks, such as cellular networks, wireless networks, local area networks (LANs), wide area networks (WANs), personal area networks (PANs), the Internet, or any other type of network configured to communicate information between computing devices (e.g., the cloud computing platform 102, and the client devices 104(1)-(N)). Some examples of the client devices 104(1)-(n) include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc.

Further, each tenant component 112 may be provided via one or more services 114 of the cloud computing platform 102. Some examples of the services 114(1)-(N) include infrastructure as a service (IaaS), platform as a service (PaaS), software as a service (SaaS), database as a service (DaaS), security as a service (SECaaS, big data as a service (BDaaS), a monitoring as a service (MaaS), logging as a service (LaaS), internet of things as a service (IOTaaS), identity as a service (IDaaS), analytics as a service(AaaS), function as a service (FaaS), and/or coding as a service (CaaS). Further, the system resources 110(1)-(n) may be reserved for use by the services 114(1)-(n). Some examples of the system resources 110(1)-(n) include computing units, bandwidth, data storage, application gateways, software load balancers, memory, field programmable gate arrays (FPGAs), graphics processing units (GPUs), input-output (I/O) throughput, data/instruction cache, physical machines, virtual machines, clusters of virtual machines, clusters of physical machines, etc. Further, the client devices 104(1)-(n) may transmit service requests 116(1)-(n) and receive service responses 118(1)-(n) corresponding to the service requests 116(1)-(n) in order to access the tenant components 112(1)-(n).

As illustrated in FIG. 1, the cloud computing platform 102 may further include a peer management module 120 configured to detect anomalous behavior based on deviations in peer activity. In some aspects, a peer relationship may exist between two or more component metrics associated with a tenant component 112, two or more component metrics across two or more tenant components 112, two or more component metrics of a service 114 or a system resource 110, or two or more component metrics across two or more services 114 or two or more system resources 110. Some examples of categories of component metrics include request duration metrics, dependency duration metrics, and client performance metrics. Further, the aforementioned categories of component metrics may be measured for any activity on the cloud computing platform 102.

An example of a request duration metric may be the amount of time that elapses between the receipt of a service request 116 at the tenant component 112(1) and transmission of the service response 118(1) by the tenant component 112(1). An example of a client performance metric may be an amount of time that elapses during completion of a process by a tenant component 112(1) for a type of a client (e.g., a type of browser, operating system, and/or client application).

In addition, as described in detail herein, component metrics having a peer relationship are expected to display similar behavior over a period of time due a common attribute, function, and/or use. For example, in some aspects, the measurements of peer metrics may be expected to be within a predefined range over a period of time. As such, the peer management module 120 may determine that a cloud computing component (e.g., a system resource 110, a tenant component 112, a service 114, etc.) is exhibiting anomalous behavior based on a metric associated with the cloud computing component deviating from a peer group of the metric.

Further, as illustrated in FIG. 1, the peer management module 120 may include a candidate management module 122, an eligibility module 124, a metrics measurement module 126, an anomaly detection module 128, and an incident management module 130. The candidate management module 122 may be configured to determine a plurality of candidate groups 132(1)-(n) each including component metrics that may potentially be a peer group 134. In some aspects, the candidate management module 122 may receive a selection of a candidate group 132 as user input information via a graphical user interface (GUI) from an administrator device 136 associated with an administrator of a tenant component 112 and/or the cloud computing platform 102. In some other aspects, the candidate management module 122 may be configured to identify the plurality of component metrics within a candidate group 132 based at least in part on performance information (e.g., historic metrics information) and/or a shared attribute associated with the component metrics of the candidate group 132. Some examples of component metrics having a shared attribute include component metrics associated with a shared or similar process, shared or similar type of process, shared or similar type of cloud component, etc. For example, the candidate management module 122 may identify that a first component metric is associated with performance of a process by a first type of browser and that a second component metric is associated with performance of the process by a second type of browser. As a result, the candidate management module 122 may form a candidate group 132 including the first component metric and the second component metric. As another example, the candidate management module 122 may identify that a first component metric is associated with performance of a first user initiated process over a first database table, a second component metric is associated with performance of a second user initiated process over a second database table, and measurements of the first component metric and second component metric are often within a shared range. As a result, the candidate management module 122 may form a candidate group 132 including the first component metric and the second component metric. Further, the candidate management module 122 may employ machine learning and/or pattern recognition techniques to identify the plurality of component metrics within a candidate group 132.

Further, the eligibility module 124 may be configured to determine whether a candidate group 132 is a peer group 134. As a result, the eligibility module 124 verifies that a peer relationship exists between the component metrics provided by the candidate management module 122, as an administrator and/or the candidate management module 122 may improperly predict that a plurality of component metrics have a peer relationship. In some aspects, the eligibility module 124 may be configured to determine whether the plurality of component metrics of a candidate group 132 are a peer group 134 based on at least one non-pointwise technique and one pointwise technique. For example, the eligibility module 124 may be configured to determine a cluster profile of the component metrics of the candidate group 132 in accordance with a non-pointwise approach, and a sequence of times series representing the component metrics of the candidate group 132 in a pointwise approach. Further, the eligibility module 124 may determine whether a candidate group 132 is a cluster eligible based on the cluster profile of the candidate group 132 and/or deviation eligible based on one or more attributes of the sequence of time series. Further, the eligibility module 124 may determine that a candidate group 132 is a peer group 134 when the candidate group 132 is cluster eligible and/or deviation eligible.

In some aspects, the eligibility module 124 may be configured to generate the cluster profile from historical metrics information of each component metric of the candidate group 132 via a clustering algorithm e.g., hierarchical density-based spatial of applications with noise (HDB-SCAN), DBSCAN, dynamic clustering, k-means clustering. The eligibility module 124 may be configured to identify the clusters within the cluster profile associated with the candidate group 132. As used herein, a "cluster" may refer to highly dense regions separated by sparse regions with a graphical representation of the historical metrics information. Further, the clusters within the graphical representation may correspond to highly probable regions separated by improbable regions.

In some aspects, the eligibility module 124 may determine the cluster eligibility of the candidate group 132 by comparing the number of clusters having a specific attribute at different scales to a preconfigured threshold. For example, the eligibility module 124 may identify the clusters within the historical metrics information of the candidate group 132, and the persistence of each identified cluster via HDB-SCAN. In particular, the eligibility module 124 may determine that the candidate group 132 is cluster eligible based on comparing the persistence of a root cluster identified by HDBSCAN with persistence values of other clusters identified by HDBSCAN. For example, the eligibility module 124 may define a minimal cluster size the eligibility module 124 may determine cluster eligibility when the following criteria is not met:

$$\frac{\text{persistence}(C_{root})}{\text{persistence}(C_{root}) + \text{persistence}(C_{Noroot})} \geq \text{threshold} \qquad \text{(Equation 1)}$$

Where persistence($C_{root}$) equals the solution persistence when considering the option of having just a root cluster, and persistence($C_{Noroot}$) equals the solution persistence when not considering the option of having solely the root cluster. In some aspects, the threshold may be equal to a ninety-five percent probability that the candidate group is a single cluster. Further, in some aspects, the eligibility module 124 may provide notification of the component metrics that belong to the different clusters when the eligibility module 124 identifies two or more clusters.

Further, in some aspects, the eligibility module 124 may be configured determine the sequence of time series slices from historical metrics information of the candidate group 132. For example, the eligibility module 124 may partition the time series of the cloud component metrics of the candidate group 132 into the sequence of time series slices according to a preconfigured bin size. In addition, the eligibility module 124 may determine an upper bound and a lower bound of an adjustable boxplot. As described herein, a boxplot may refer to a representation of groups of numerical data through their quartiles. In addition, the eligibility module 124 be configured to determine the number of anomalous time series within the sequence of time series slices and the number of consecutive anomalous time series within the sequence of time series slices. In some aspects, the eligibility module 124 may determine that a candidate group 132 is deviation eligible when none of corresponding time series have a percentage of measurements (i.e., points) outside the adjustable boxplot that is greater than or equal to a preconfigured percentage (e.g., thirty percent), a number of measurements outside the adjustable boxplot that is greater than or equal to a preconfigured amount, a percentage of consecutive measurements outside the adjustable boxplot that is greater than or equal to a preconfigured percentage (e.g., twenty percent), and/or a number of consecutive measurements outside the adjustable boxplot that is greater than or equal to a preconfigured amount.

In addition, the eligibility module 124 may be configured to determine the upper bound of the adjustable boxplot by determining the two highest values having a first largest difference, and selecting the lower of the two highest values as the upper bound of the adjustable boxplot. In addition, the eligibility module 124 may be configured to determine the lower bound of the adjustable boxplot by determining he two lowest values having a second largest difference, and select the higher of the two lowest values as the lower bound of the adjustable boxplot.

Further, in some aspects, the eligibility module 124 may be configured to determine that an existing peer group 134 should no longer be considered a peer group 134. For example, the eligibility module 124 may determine that the peer group 134 consistently has one or more deviating component metrics within the peer group 134 and remove the peer group 134. In some aspects, the anomaly detection module 128 may determine that an amount of anomalies detected with respect to a peer group over a period of time is greater than a preconfigured threshold, and notify the eligibility module 124. In response, the eligibility module 124 may remove the peer group 134. Further, in some aspects, the eligibility module 124 may generate a new candidate group 132 using two or more component metrics of the removed peer group 134. In particular, the new candidate group 132 may not include one or more component metrics of the removed the peer group 134 that caused the peer group 134 to be removed. Further, the eligibility module 124 may determine whether the new candidate group 132 is a peer group 134, as described in detail herein.

Additionally, in some aspects, the metrics measurement module 126 may be configured to determine metrics information 138 representing measurements of the component metrics within the candidate groups 132 and/or the peer groups 134. In some aspects, metrics information 138 may include request duration measurements, dependency duration measurements, and/or client performance measurements associated with the cloud components. Some features of a cloud component that may have a request duration metric include an operation, a host name, a cloud role instance, or a cloud role name. Some features of a cloud component that may have a dependency duration metric include dependency type, target, dependency base name, or cloud role name. Some features of a cloud component that may have a client performance metric include a client browser, a client operating system, a client country and/or region, or a client model. In some aspects, the functionality of the metrics measurement module 126 may be distributed among the cloud components. Additionally, alternatively, in some aspects, the metrics measurement module 126 may receive measurements from cloud components associated with the measurement and generate the metrics information 138. In addition, the metrics measurement module 126 may provide the metrics information 138 to the anomaly detection module 128.

The anomaly detection module 128 may be configured to detect anomalies based upon the peer groups 134. In particular, the anomaly detection module 128 may be configured to detect in near real-time anomalies associated with a peer group 134 based on one or more attributes of the time series generated from the metrics information associated with the peer group 134. In some aspects, the anomaly detection module 128 may perform the same pointwise technique performed by the eligibility module 124. For example, the anomaly detection module 128 may be configured to generate a time series slice from the metrics information 138 based on the preconfigured bin size, and determine if the time series slice includes anomalous behavior based on a deviation in peer behavior. In particular, the anomaly detection module 128 may determine anomalous activity within the peer group 134 when at least one of corresponding time series within the time series slice have a percentage of measurements outside the adjustable boxplot that is greater than or equal to a preconfigured percentage (e.g., thirty percent), a number of measurements outside the adjustable boxplot that is greater than or equal to a preconfigured amount, a percentage of consecutive measurements outside the adjustable boxplot that is greater than or equal to a preconfigured percentage (e.g., twenty percent), and/or a number of consecutive measurements outside the adjustable boxplot that is greater than or equal to a preconfigured amount.

Further, the incident management module 130 may be configured to provide notification of potentially anomalous activity detected by the anomaly detection module 128. For example, the incident management module 130 may receive an indication of a potential anomaly for a tenant component 112(1) associated with a time series that deviated from the peer group 134 from the anomaly detection module 128, and transmit an anomaly notification 140 to a client device 104(1) associated with the tenant component 112(1). In some aspects, the anomaly notification 140 may identify the tenant component 112(1). Further, in some aspects, the incident management module 130 may trigger remediation activity by a service 114 configured to automatically mitigate degraded performance of the cloud computing platform 102. For example, the incident management module 130 may receive an indication of a potential anomaly for a service 114(1) from the anomaly detection module 128, and transmit an anomaly notification 140 to a service 114(2) configured to repair degraded services 114 on the cloud computing platform 102.

FIG. 2A illustrates an example graphical representation 200 of a candidate group 132 having a cluster eligible cluster profile, in accordance with some aspects of the present disclosure. As illustrated in FIG. 2A, the graphical representation 200 includes a single root cluster with significant persistence. FIG. 2B illustrates an example graphical representation 202 of a candidate group 132 having a cluster ineligible cluster profile, in accordance with some aspects of the present disclosure. FIG. 2C illustrates an example graphical representation 204 of a candidate group 132 failing to exhibit peer-like behavior over a period of time as at least two time series with a number and/or percentage of measurements outside of the boxplot 206 during the time slice between 800 and 1000 and the time slice between 1000 and 1200, in accordance with some aspects of the present disclosure. FIG. 2D illustrates an example graphical representation 208 of a candidate group 132 exhibiting peer-like behavior over a period of time, in accordance with some aspects of the present disclosure.

Example Process

The processes described in FIG. 3 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the cloud computing platform 102. By way of example and not limitation, the method 300 is described in the context of FIGS. 1-2 and 4. For example, the operations may be performed by one or more of the peer management module 120, candidate management module 122, the eligibility module 124, the metrics measurement module 126, the anomaly detection module 128, and the incident management module 130.

Figure 3:
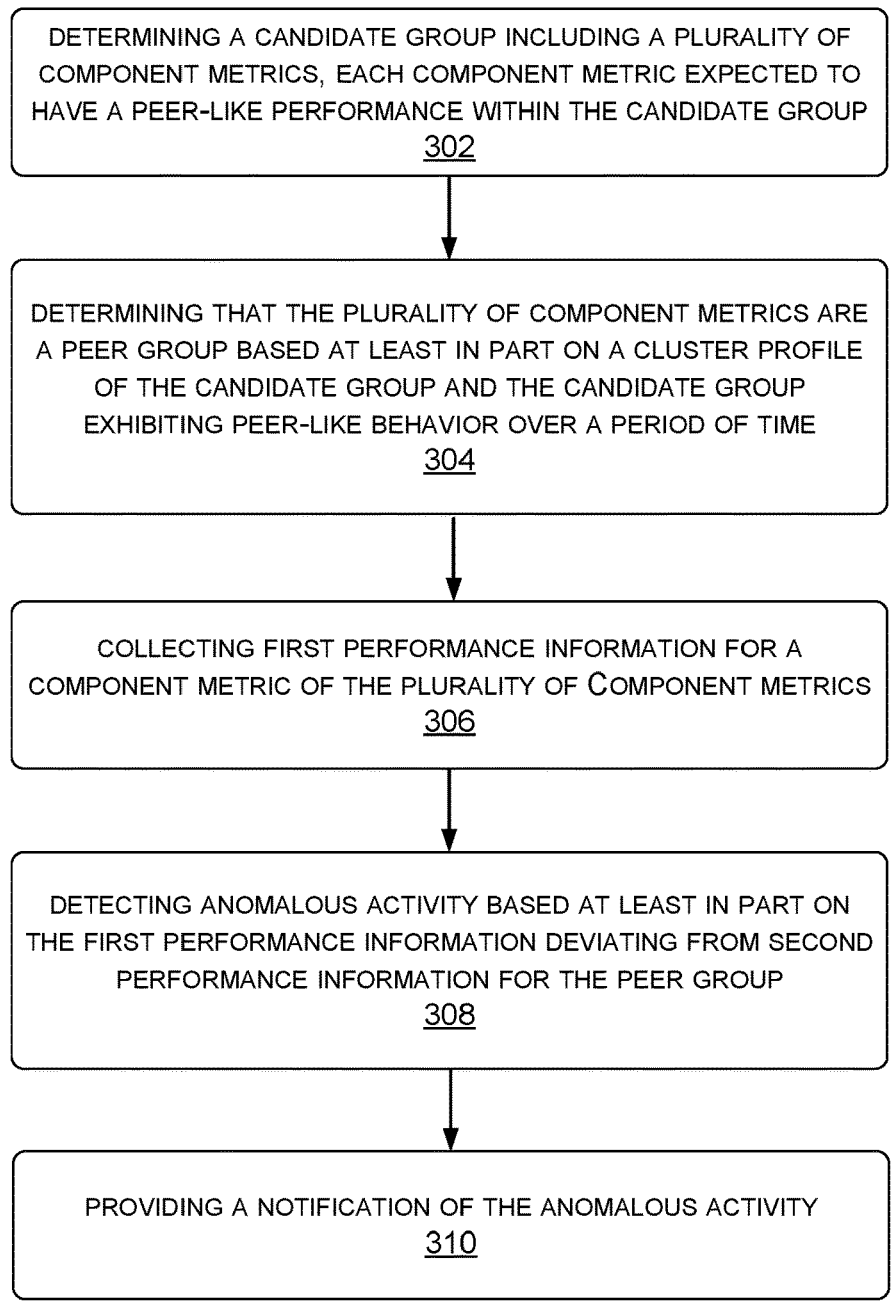
FIG. 3 is a flow diagram illustrating an example method for evaluating peer groups for comparative anomaly, in accordance with some aspects of the present disclosure.

FIG. 3 is a flow diagram illustrating an example method 300 for evaluating peer groups for comparative anomaly, in accordance with some aspects of the present disclosure.

At block 302, the method 300 may include determining a candidate group including a plurality of component metrics, each component metric corresponding to an associated cloud component and expected to have measurements within a range associated with the candidate group. For example, in some aspects, the candidate management module 122 may receive a selection of a candidate group 132 as user input information via a graphical user interface (GUI) from an administrator device 136 associated with an administrator of a tenant component 112 and/or the cloud computing platform 102. In some other aspects, the candidate management module 122 may be configured to identify the plurality of component metrics within a candidate group 132 based at least in part on performance information and/or a shared attribute associated with the component metrics of the candidate group 132.

Accordingly, the cloud computing platform 102, the cloud computing device 400, and/or the processor 402 executing the peer management module 120 and/or the candidate management module 122 may provide means for determining a candidate group including a plurality of component metrics, each component metric corresponding to an associated cloud component and expected to have measurements within a range associated with the candidate group.

At block 304, the method 300 may include determining that the plurality of component metrics are a peer group based at least in part on a cluster profile of the candidate group and the candidate group exhibiting peer-like behavior over a period of time. For example, the eligibility module 124 may determine that the candidate group 132 is a peer group 134 based on the candidate group being cluster eligible and deviation eligible.

Accordingly, the cloud computing platform 102, the cloud computing device 400, and/or the processor 402 executing the peer management module 120 and/or the eligibility module 124 may provide means for determining that the plurality of component metrics are a peer group based at least in part on a cluster profile of the candidate group and the candidate group exhibiting peer-like behavior over a period of time.

At block 306, the method 300 may include collecting first performance information for a component metric of the plurality of component metrics. For example, the metrics measurement module 126 may determine the metrics information 138 for the peer group 134.

Accordingly, the cloud computing platform 102, the cloud computing device 400, and/or the processor 402 executing the peer management module 120 and/or the metrics measurement module 126 may provide means for collecting first performance information for a component metric of the plurality of component metrics.

At block 308, the method 300 may include detecting anomalous activity based at least in part on the first performance information deviating from second performance information for the peer group. For example, the anomaly detection module 128 may detect deviation within the peer group 134 based on the metrics information 138.

Accordingly, the cloud computing platform 102, the cloud computing device 400, and/or the processor 402 executing the peer management module and/or the anomaly detection module 128 may provide means for detecting anomalous activity based at least in part on the first performance information deviating from second performance information for the peer group.

At block 310, the method 300 may include providing a notification of the anomalous activity. For example, the incident management module 130 may receive an indication of a potential anomaly for a tenant component 112(1) from the anomaly detection module 128, and transmit an anomaly notification 140 to a client device 104(1) associated the tenant component 112(1).

Accordingly, the cloud computing platform 102, the cloud computing device 400, and/or the processor 402 executing the peer management module and/or the incident management module 130 may provide means for providing a notification of the anomalous activity.

Additionally, or alternatively, in an aspect, the candidate group may be a first candidate group, the plurality of component metrics may be a first plurality of component metrics, the peer group may be a first peer group, the period of time may be a first period of time, and the method 300 may further include determining a second candidate group including a second plurality of component metrics, each component metric of the second plurality of component metrics expected to have a peer-like performance within the second candidate group, determining that a third plurality of component metrics are a second peer group based at least in part on a cluster profile of the second candidate group and the third plurality of component metrics exhibiting peer-like behavior over a second period of time, wherein the third plurality of component metrics is a subset of the second plurality of component metrics and a first total number of component metrics of the second plurality of component metrics is greater than a second total number of component metrics of the third plurality of component metrics, and performing anomaly detection based on the second peer group. For example, the eligibility module 124 may determine that a subset of a candidate group 132 are a cluster eligible and deviation eligible. Further, the eligibility module 124 form a peer group 134 from the subset of the candidate group 132, and the anomaly detection module 128 may evaluate the peer group 134 for comparative anomaly, as described in detail herein.

Accordingly, the cloud computing platform 102, the cloud computing device 400, and/or the processor 402 executing the peer management module 120, the eligibility module 124, and/or the anomaly detection module 128 may provide means for determining a second candidate group including a second plurality of component metrics, each component metric of the second plurality of component metrics expected to have a peer-like performance within the second candidate group, determining that a third plurality of component metrics are a second peer group based at least in part on a cluster profile of the second candidate group and the third plurality of component metrics exhibiting peer-like behavior over a second period of time, wherein the third plurality of component metrics is a subset of the second plurality of component metrics and a first total number of component metrics of the second plurality of component metrics is greater than a second total number of component metrics of the third plurality of component metrics, and performing anomaly detection based on the second peer group.

Additionally, or alternatively, in an aspect, a component metric may be a first component metric, and the method 300 may further include detecting a deviation by a second component metric of the plurality of component metrics from the peer group, and removing the second component metric from the peer group based on the deviation. Accordingly, the cloud computing platform 102, the cloud computing device 400, and/or the processor 402 executing the peer management module 120, the eligibility module 124, and/or the anomaly detection module 128 may provide means for detecting a deviation by a second component metric of the plurality of component metrics from the peer group, and removing the second component metric from the peer group based on the deviation.

Additionally, or alternatively, in an aspect, in order to determine that the plurality of component metrics are the peer group, the method 300 may further include determining an upper bound and a lower bound of an adjustable boxplot, generating a plurality of time series based on historical metrics information of the candidate group, determining that the plurality of time series do not include a first time series having a first percentage of points outside of the adjustable boxplot that is greater than a first preconfigured threshold, and determining that the plurality of time series do not include a second time series having a second percentage of consecutive points outside of the adjustable boxplot that is greater than a second preconfigured threshold. Further, the eligibility module 124 may determine the upper bound of the adjustable boxplot by determining the two highest values having a largest difference, and selecting the lower of the two highest values as the upper bound of the adjustable boxplot. In addition, the eligibility module 124 may be configured to determine the lower bound of the adjustable boxplot by determining the two lowest values having a largest difference, and selecting the higher of the two lowest values as the lower bound of the adjustable boxplot. Accordingly, the cloud computing platform 102, the cloud computing device 400, and/or the processor 402 executing the peer management module 120 and/or the eligibility module 124 may provide means for determining an upper bound and a lower bound of an adjustable boxplot, generating a plurality of time series based on historical metrics information of the candidate group, determining that the plurality of time series do not include a first time series having a first percentage of points outside of the adjustable boxplot that is greater than a first preconfigured threshold, and determining that the plurality of time series do not include a second time series having a second percentage of consecutive points outside of the adjustable boxplot that is greater than a second preconfigured threshold.

Additionally, or alternatively, in an aspect, in order to determine that the plurality of component metrics are the peer group, the method 300 may further include determining an upper bound and a lower bound of an adjustable boxplot, generating a plurality of time series based on historical metrics information of the candidate group, determining that the plurality of time series do not include a first time series having a first percentage of points outside of the adjustable boxplot that is greater than a first preconfigured threshold, and determining that the plurality of time series do not include a second time series having a second percentage of consecutive points outside of the adjustable boxplot that is greater than a second preconfigured threshold. Accordingly, the cloud computing platform 102, the cloud computing device 400, and/or the processor 402 executing the peer management module 120 and/or the eligibility module 124 may provide means for determining an upper bound and a lower bound of an adjustable boxplot, generating a plurality of time series based on historical metrics information of the candidate group, determining that the plurality of time series do not include a first time series having a first percentage of points outside of the adjustable boxplot that is greater than a first preconfigured threshold, and determining that the plurality of time series do not include a second time series having a second percentage of consecutive points outside of the adjustable boxplot that is greater than a second preconfigured threshold.

Additionally, or alternatively, in an aspect, in order to detect the anomalous activity, and the method 300 may further include generating a time series slice based on the first performance information, the second performance information, and an adjustable boxplot, determining a first number of points of the first performance information outside the adjustable boxplot, determining a first percentage of points of the first performance information outside the adjustable boxplot, determining a second number of consecutive points of the first performance information outside the adjustable boxplot, determining a second percentage of consecutive points of the first performance information outside the adjustable boxplot, and detecting the anomalous activity based on the first number, the first percentage, the second number, or the second percentage being above a preconfigured threshold. For example, the anomaly detection module 128 may be configured to generate a time series slice from the metrics information 138 based on the preconfigured bin size, and determine if the time series slice includes anomalous behavior based on a deviation in peer behavior. Accordingly, the cloud computing platform 102, the cloud computing device 400, and/or the processor 402 executing the peer management module 120 and/or the anomaly detection module 128 may provide means for determining an upper bound and a lower bound of an adjustable boxplot, generating a plurality of time series based on historical metrics information of the candidate group, determining that the plurality of time series do not include a first time series having a first percentage of points outside of the adjustable boxplot that is greater than a first preconfigured threshold, and determining that the plurality of time series do not include a second time series having a second percentage of consecutive points outside of the adjustable boxplot that is greater than a second preconfigured threshold.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 4:
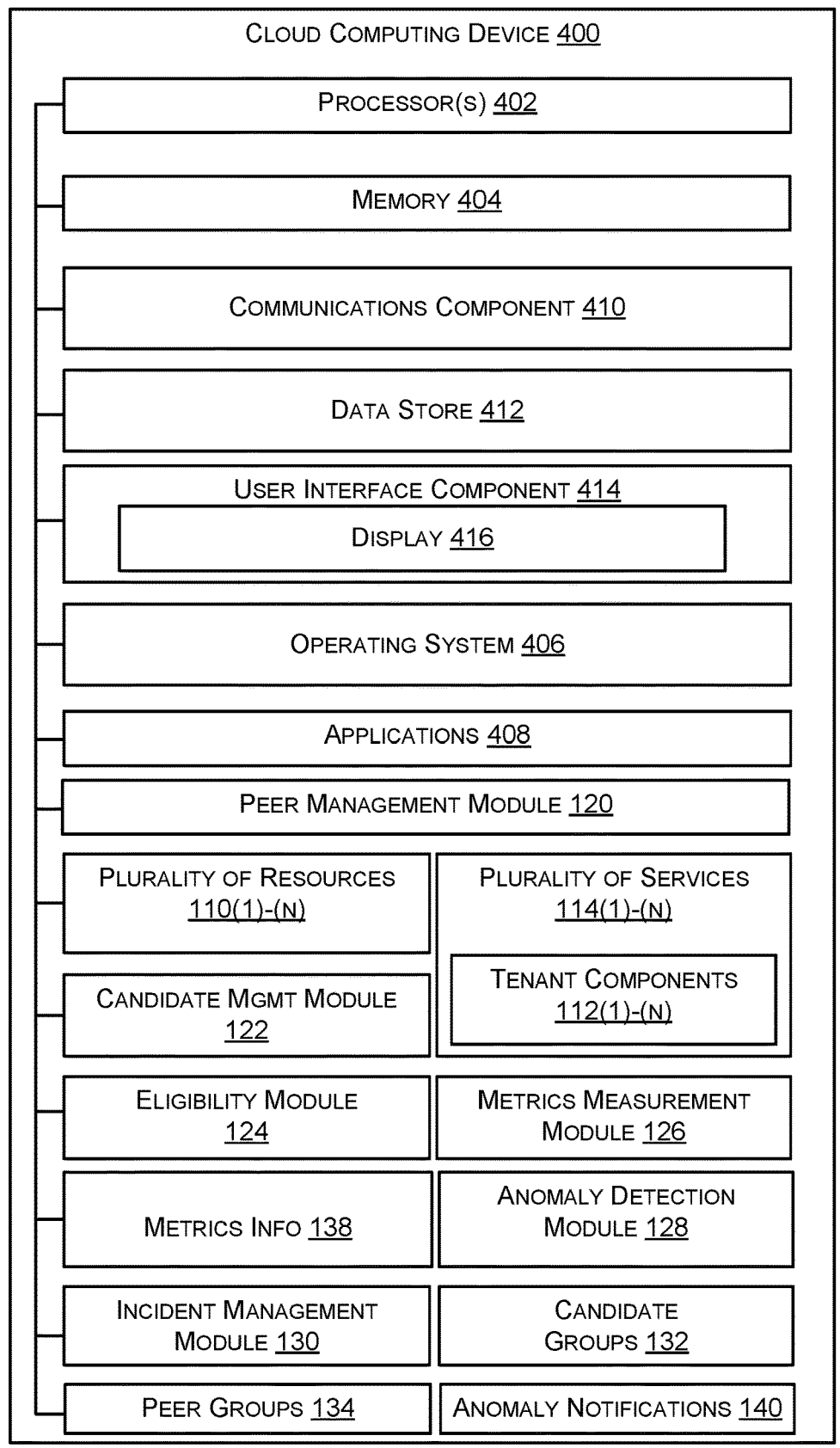
FIG. 4 is a block diagram illustrating an example of a hardware implementation for a cloud computing device(s), in accordance with some aspects of the present disclosure.

Referring now to FIG. 4, an example of a cloud computing device(s) 400 (e.g., cloud computing platform 102). In one example, the cloud computing device(s) 400 includes the processor 402 for carrying out processing functions associated with one or more of components and functions described herein. The processor 402 can include a single or multiple set of processors or multi-core processors. Moreover, the processor 402 may be implemented as an integrated processing system and/or a distributed processing system. In an example, the processor 402 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 402 may include other processing components such as one or more arithmetic logic units (ALUs), registers, or control units.

In an example, the cloud computing device 400 also includes the memory 404 for storing instructions executable by the processor 402 for carrying out the functions described herein. The memory 404 may be configured for storing data and/or computer-executable instructions defining and/or associated with the operating system 406, the peer management module 120, candidate management module 122, the eligibility module 124, the metrics measurement module 126, the anomaly detection module 128, the incident management module 130, the candidate groups 132, the peer group 134, and the metrics information 138, and the processor 402 may execute the operating system 406, the peer management module 120, candidate management module 122, the eligibility module 124, the metrics measurement module 126, the anomaly detection module 128, and the incident management module 130. An example of memory 404 may include, but is not limited to, a type of memory usable by a computer, such as random access memory (RAM), read only memory (ROM), tapes, magnetic discs, optical discs, volatile memory, non-volatile memory, and any combination thereof. In an example, the memory 404 may store local versions of applications being executed by processor 402.

The example cloud computing device 400 also includes a communications component 410 that provides for establishing and maintaining communications with one or more parties utilizing hardware, software, and services as described herein. The communications component 410 may carry communications between components on the cloud computing device 400, as well as between the cloud computing device 400 and external devices, such as devices located across a communications network and/or devices serially or locally connected to the cloud computing device 400. For example, the communications component 410 may include one or more buses, and may further include transmit chain components and receive chain components associated with a transmitter and receiver, respectively, operable for interfacing with external devices. In an implementation, for example, the communications component 410 may include a connection to communicatively couple the client devices 104(1)-(N) to the processor 402.

The example cloud computing device 400 also includes a data store 412, which may be any suitable combination of hardware and/or software, that provides for mass storage of information, databases, and programs employed in connection with implementations described herein. For example, the data store 412 may be a data repository for the operating system 406 and/or the applications 408.

The example cloud computing device 400 also includes a user interface component 414 operable to receive inputs from a user of the cloud computing device 400 and further operable to generate outputs for presentation to the user. The user interface component 414 may include one or more input devices, including but not limited to a keyboard, a number pad, a mouse, a touch-sensitive display (e.g., display 416), a digitizer, a navigation key, a function key, a microphone, a voice recognition component, any other mechanism capable of receiving an input from a user, or any combination thereof. Further, the user interface component 414 may include one or more output devices, including but not limited to a display (e.g., display 416), a speaker, a haptic feedback mechanism, a printer, any other mechanism capable of presenting an output to a user, or any combination thereof.

In an implementation, the user interface component 414 may transmit and/or receive messages corresponding to the operation of the operating system 406 and/or the applications 408. In addition, the processor 402 executes the operating system 406 and/or the applications 408, and the memory 404 or the data store 412 may store them.

Further, one or more of the subcomponents of the peer management module 120, candidate management module 122, the eligibility module 124, the metrics measurement module 126, the anomaly detection module 128, and the incident management module 130, may be implemented in one or more of the processor 402, the applications 408, the operating system 406, and/or the user interface component 414 such that the subcomponents of the peer management module 120, candidate management module 122, the eligibility module 124, the metrics measurement module 126, the anomaly detection module 128, and the incident management module 130, are spread out between the components/subcomponents of the cloud computing device 400.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

Example Clauses

A. A method comprising: determining a candidate group including a plurality of component metrics, each component metric corresponding to an associated cloud component and expected to have measurements within a range associated with the candidate group, determining that the plurality of component metrics are a peer group based at least in part on a cluster profile of the candidate group and the candidate group exhibiting peer-like behavior over a period of time, collecting first performance information for a component metric of the plurality of component metrics, detecting anomalous activity based at least in part on the first performance information deviating from second performance information for the peer group, and providing a notification of the anomalous activity . . .

B. The method as paragraph A recites, wherein determining the candidate group, comprises receiving, via a graphical user interface (GUI), user input information identifying the plurality of component metrics.

C. The method as paragraph B recites, wherein determining the candidate group, comprises identify the plurality of component metrics based at least in part on performance information and/or a shared attribute.

D. The method as any of paragraphs A-C recite, wherein the candidate group is a first candidate group, the plurality of component metrics is a first plurality of component metrics, the peer group is a first peer group, the period of time is a first period of time, and further comprising determining a second candidate group including a second plurality of component metrics, each component metric of the second plurality of component metrics expected to have a peer-like performance within the second candidate group, determining that a third plurality of component metrics are a second peer group based at least in part on a cluster profile of the second candidate group and the third plurality of component metrics exhibiting peer-like behavior over a second period of time, wherein the third plurality of component metrics is a subset of the second plurality of component metrics and a first total number of component metrics of the second plurality of component metrics is greater than a second total number of component metrics of the third plurality of component metrics, and performing anomaly detection based on the second peer group.

E. The method as any of paragraphs A-D recite, wherein the component metric is a first component metric, and further comprising detecting a deviation by a second component metric of the plurality of component metrics from the peer group, and removing the second component metric from the peer group based on the deviation.

F. The method as any of paragraphs A-E recite, wherein determining that the plurality of component metrics are the peer group, comprises determining an upper bound and a lower bound of an adjustable boxplot; generating a plurality of time series based on historical metrics information of the candidate group; determining that the plurality of time series do not include a first time series having a first percentage of points outside of the adjustable boxplot that is greater than a first preconfigured threshold; and determining that the plurality of time series do not include a second time series having a second percentage of consecutive points outside of the adjustable boxplot that is greater than a second preconfigured threshold.

G. The method as paragraph F recites, wherein determining the upper bound and the lower bound of the adjustable boxplot, comprising determining a two highest values with a first largest difference, selecting a lower value of the two highest values as the upper bound of the adjustable boxplot, determining a two lowest values with a second largest difference, and selecting a higher value of the two lowest values as the lower bound of the adjustable boxplot.

H. The method as any of paragraphs A-G recite, wherein determining that the plurality of component metrics are the peer group, comprises generating, based on a clustering algorithm, the cluster profile from historical metrics information of the candidate group, the cluster profile indicating a number of persistent clusters associated with the candidate group, and determine the number of persistent clusters is less than a preconfigured threshold.

I. The method as any of paragraphs A-H recite, wherein to detecting the anomalous activity, comprises generating a time series slice based on the first performance information, the second performance information, and an adjustable boxplot, determining a first number of points of the first performance information outside the adjustable boxplot, determining a first percentage of points of the first performance information outside the adjustable boxplot;, determining a second number of consecutive points of the first performance information outside the adjustable boxplot, determining a second percentage of consecutive points of the first performance information outside the adjustable boxplot, and detecting the anomalous activity based on the first number, the first percentage, the second number, or the second percentage being above a preconfigured threshold.

J. The method as any of paragraphs A-I recite, wherein each component metric of the plurality of component metrics corresponds to a measurement of an attribute of a cloud application, a cloud service, and/or a cloud resource.

K. The method as any of paragraphs A-I recite, wherein each component metric of the plurality of component metrics measures one of a request duration, a dependency duration, or client performance.

L. A cloud computing device, comprising a memory storing computer-executable instructions; and at least one processor coupled with the memory and configured to execute the computer-executable instructions to perform the method of any of paragraphs A-K.

M. A cloud computing device, comprising means for performing the method of any of paragraphs A-K.

N. A non-transitory computer-readable medium storing computer executable code, the code when executed by a processor causes the processor to perform the method of any of paragraphs A-K.

What is claimed is:
1. A system comprising:
a processing unit; and
a memory coupled to the processing unit and storing instructions that, when executed, perform operations comprising:
identifying a plurality of component metrics, wherein each component metric of the plurality of component metrics corresponds to an associated cloud component and is expected to have measurements within a particular range;
determining that the plurality of component metrics is a peer group, wherein the determining includes:

generating a plurality of time series based on historical metrics information of the plurality of component metrics; and determining that the plurality of time series do not include a first time series having a first number of points that exceed a first threshold;

detecting anomalous activity based on first performance information for a first component metric of the plurality of component metrics deviating from second performance information for the peer group; and providing a notification of the anomalous activity.

2. The system of claim 1, wherein the first performance information includes at least one of:
request duration measurements;
dependency duration measurements; or
client performance measurements.

3. The system of claim 1, wherein identifying the plurality of component metrics comprises at least one of:
receiving a selection of the plurality of component metrics as user input information;
evaluating the historical metrics information; or
evaluating a shared attribute associated with the plurality of component metrics.

4. The system of claim 3, wherein the shared attribute corresponds to at least one of:
a shared process;
a shared type of process; or
a shared type of cloud component.

5. The system of claim 1, wherein determining that the plurality of component metrics is the peer group further includes:
determining that the plurality of time series do not include a second time series having a second number of consecutive points that exceed a second threshold.

6. The system of claim 1, wherein determining that the plurality of component metrics is the peer group further includes at least one of:
determining that the plurality of component metrics is cluster eligible based on a cluster profile; or
determining that the plurality of component metrics is deviation eligible based on one or more attributes of the plurality of time series.

7. The system of claim 6, wherein the cluster profile is generated from the historical metrics information using a clustering algorithm.

8. The system of claim 6, wherein determining that the plurality of component metrics is cluster eligible comprises comparing a number of clusters having a specific attribute at different scales to a preconfigured threshold.

9. The system of claim 1, wherein the first threshold is based on a boxplot that is associated with the plurality of component metrics.

10. The system of claim 1, wherein the operations further comprise:
determining over time that a second component metric of the plurality of component metrics consistently deviates from the plurality of component metrics; and
removing the peer group based on the second component metric consistently deviating from the plurality of component metrics.

11. The system of claim 10, wherein the operations further comprise:
in response to removing the peer group, forming a subset of the plurality of component metrics by removing the second component metric from the plurality of component metrics; and determining that the subset of the plurality of component metrics is a new peer group.

12. The system of claim 1, wherein providing the notification of the anomalous activity triggers remediation activity by a service configured to automatically mitigate degraded performance of cloud components.

13. A method comprising:
identifying a plurality of component metrics, wherein each component metric of the plurality of component metrics corresponds to an associated cloud component and is expected to have measurements within a particular range;
determining that the plurality of component metrics is a peer group, wherein the determining includes:
generating a plurality of time series based on historical metrics information of the plurality of component metrics; and
determining that the plurality of time series do not include a first time series having a first number of points that exceed a first threshold;
detecting anomalous activity based on first performance information for a first component metric of the plurality of component metrics deviating from second performance information for the peer group; and
providing a notification of the anomalous activity.

14. The method of claim 13, identifying the plurality of component metrics includes determining that the plurality of component metrics shares a common attribute.

15. The method of claim 13, wherein identifying the plurality of component metrics includes receiving a selection of the plurality of component metrics as user input information via a graphical user interface.

16. The method of claim 13, wherein determining that the plurality of component metrics is a peer group further includes determining the plurality of component metrics is cluster eligible and deviation eligible.

17. The method of claim 13, wherein determining that the plurality of component metrics is a peer group further includes determining an upper bound and a lower bound for the plurality of component metrics.

18. The method of claim 17, wherein determining the upper bound comprises:
determining two highest values having a largest difference; and
selecting a lower of the two highest values as the upper bound.

19. The method of claim 17, wherein determining the lower bound comprises:
determining two lowest values having a largest difference; and
selecting a higher of the two lowest values as the lower bound.

20. A device comprising:
a processing unit; and
a memory coupled to the processing unit and storing instructions that, when executed, perform operations comprising:
identifying a plurality of component metrics, wherein each component metric of the plurality of component metrics corresponds to an associated cloud component and is expected to have measurements within a particular range;
determining that the plurality of component metrics is a peer group, wherein the determining includes:
generating a plurality of time series based on historical metrics information of the plurality of component metrics; and determining that the plurality of time series do not include a first time series having a first number of points that exceed a first threshold;

detecting anomalous activity based on first performance information for a first component metric of the plurality of component metrics deviating from second performance information for the peer group; and providing a notification of the anomalous activity.

* * * * *